(12) United States Patent
Karam

(10) Patent No.: US 6,485,823 B2
(45) Date of Patent: Nov. 26, 2002

(54) ABRASION RESISTANT LAMINATE AND PROCESS FOR PRODUCING SAME

(75) Inventor: Fouad Torkum Karam, Hamden, CT (US)

(73) Assignee: Panolam Industries International Inc., Shelton, CT (US)

( * ) Notice: Subject to any disclaimer, the term of this patent is extended or adjusted under 35 U.S.C. 154(b) by 0 days.

(21) Appl. No.: 09/977,425

(22) Filed: Oct. 15, 2001

(65) Prior Publication Data

US 2002/0025426 A1 Feb. 28, 2002

Related U.S. Application Data

(62) Division of application No. 09/231,105, filed on Jan. 14, 1999, now Pat. No. 6,325,884.

(51) Int. Cl.$^7$ ................................................. B32B 5/16
(52) U.S. Cl. .................... 428/323; 428/329; 428/331; 428/447; 428/537.5; 156/278; 156/279; 156/307.3; 156/307.5; 156/307.7
(58) Field of Search ................................ 156/278, 279, 156/307.3, 307.5, 307.7; 428/323, 329, 331, 447, 537.5

(56) References Cited

U.S. PATENT DOCUMENTS

| 3,373,070 A | 3/1968 | Fuerst .......................... 161/79 |
| 3,373,071 A | 3/1968 | Fuerst .......................... 161/79 |
| 3,589,974 A | 6/1971 | Albrinck et al. ............. 161/150 |
| 3,975,572 A | 8/1976 | Power ........................... 428/452 |
| 4,255,480 A | 3/1981 | Scher et al. ................. 428/208 |
| 4,322,468 A | 3/1982 | Raghava ...................... 428/204 |
| 4,327,141 A | 4/1982 | Scher et al. ................. 428/148 |
| 4,395,452 A | 7/1983 | Scher et al. ................. 428/148 |
| 4,400,423 A | 8/1983 | Scher et al. ................. 428/204 |
| 4,473,613 A | 9/1984 | Jaisle et al. ................. 428/220 |
| RE32,152 E | 5/1986 | Scher et al. ................. 428/148 |
| 4,713,138 A | 12/1987 | Ungar et al. ............. 156/307.4 |
| 4,880,689 A | 11/1989 | Park et al. ................... 428/143 |
| 4,940,503 A | * 7/1990 | Lindgren ..................... 156/279 |
| 5,034,272 A | 7/1991 | Lindgren et al. ........... 428/331 |
| 5,037,694 A | 8/1991 | Ungar et al. ................ 428/326 |
| 5,093,185 A | 3/1992 | Ungar et al. ................ 428/204 |
| 5,266,384 A | 11/1993 | O'Dell et al. ............... 428/207 |
| 5,288,540 A | 2/1994 | Albrinck et al. ........... 428/208 |
| 5,362,557 A | 11/1994 | Albrinck et al. ........... 428/323 |
| 5,456,949 A | 10/1995 | Albrinck et al. ........... 427/411 |
| 5,558,906 A | 9/1996 | Albrinck et al ............. 427/180 |
| 5,702,806 A | 12/1997 | O'Dell et al. ............... 428/206 |
| 4,940,503 A | * 11/1998 | Lindgren ..................... 156/279 |

* cited by examiner

Primary Examiner—Leszek Kiliman
(74) Attorney, Agent, or Firm—McCormick, Paulding & Huber LLP

(57) ABSTRACT

A laminated panel having an abrasion resistant surface is provided. The laminated panel includes a web being impregnated with a thermo-set resin, a bottom coat and an abrasion resistant top coat; a substrate; and thermo-fusing a bottom sheet to a second surface of the substrate opposite the first surface. The web is thermo-fused to one surface of the substrate, and the bottom sheet is simultaneously thermo-fused to the opposite surface of the substrate. A process for making an abrasion resistant laminated panel is also provided. The process includes the steps of partially impregnating a paper sheet or web with a thermosetting resin, drying it, coating the top side of the partially impregnated paper sheet or web with an abrasion resistant coat, simultaneously coating the bottom side of the paper sheet or web with a thermosetting resin composition, thermo-fusing the coated paper sheet or web to a first surface of a substrate and a bottom sheet to produce the laminated panel.

12 Claims, 2 Drawing Sheets

TABLE 1

| Formula | MF Only, Parts | MF/UF Mixed, Parts |
|---|---|---|
| Melamine formaldehyde resin (MF) | 100 | 60 |
| Urea formaldehyde resin (UF) | 0 | 40 |
| Diethylene glycol | 6 | 8 |
| Catalyst | 1.6 | 1.5 |

TABLE 2

| Materials | Parts |
|---|---|
| Propylene glycol | 250 |
| Melamine formaldehyde resin (MF) | 60 to 120 |
| Water | 250 |
| Wetting agent | 2 to 4 |
| Defoamer | 1 to 3 |
| First Dispersing agent | 15 to 30 |
| Second Dispersing agent | 2 to 5 |
| Alumina abrasive mineral-9 microns | 160 to 200 |
| Alumina abrasive mineral-12 microns | 160 to 200 |
| Suspension agent | 40 to 60 |
| NaOH 4N | 5 |
| Natural cellulose fibers | 80 to 160 |

FIG. 3

TABLE 3

| Formula | Parts |
|---|---|
| Melamine formaldehyde resin (MF) | 100 |
| Dispersion of particles as in TABLE 2 | 25 to 35 |
| Release agent | 0.2 to 0.4 |
| Catalyst | 1.4 to 2.2 |

FIG. 4

ABRASION RESISTANT LAMINATE AND PROCESS FOR PRODUCING SAME

This application is a divisional of U.S. patent application Ser. No. 09/231,105 filed on Jan. 14, 1999 now U.S. Pat. No. 6,325,884 B1.

BACKGROUND OF THE INVENTION

1. Field of the Invention

The present invention relates to decorative panels and, more particularly, to an abrasion resistant laminate for use as a decorative panel. The abrasion resistant laminate is preferably a low pressure laminate. The laminate has preferably a printed decorative pattern, but can have a solid color. In addition, the present invention relates to a process for manufacturing such an abrasion-resistant laminated panel.

2. Description of Related Art

Decorative panels have been used to produce kitchen and bath cabinets, office furniture, store fixtures and recreational furniture. For many years, decorative furniture components were made by laminating a high pressure laminate to wood panel substrate, such as plywood or particleboard. The glue line lamination occurred either before or after the furniture was assembled. Within the past twenty-five years, a low pressure laminate has become available. Such low pressure laminates are manufactured by directly laminating the decorative sheet to the substrate under heat and pressure.

Conventionally, high pressure decorative laminates have been made by stacking and curing, under heat and pressure, a plurality of layers of paper impregnated with synthetic thermosetting resins. Normally, the assembly consists of three to eight core sheets. The assembly has from the base upward (1) phenolic resin impregnated Kraft paper, (2) a decor or decorative sheet impregnated with melamine resin, and (3) for printed patterns, an overlay sheet which, in the laminate, is almost transparent and provides protection for the decor sheet.

Some improvements are described in U.S. Pat. No. 4,255,480 and U.S. Pat. No. Re. 32,152, both to Scher, et al. For example, U.S. Pat. No. 4,255,480 discloses manufacturing decorative laminates having an ultra-thin, protective coating deposited as the uppermost layer of the decor sheet to enhance abrasion-resistant properties. The decor sheet is coated with an ultra-thin layer of a mixture of an abrasion-resistant hard mineral and a binder material. The hard mineral has a particle size of 20 to 50 microns.

Background patents of interest are U.S. Pat. Nos. 3,373,070 and 3,373,071 to Fuerst. The Fuerst technique is to impregnate the decor sheet first with plain melamine resin, and then apply a thick coating to the surface of the impregnated sheet using a relatively viscous mixture of 2,000–60,000 centi-poise.

U.S. Pat. No. 3,975,572 to Power employs an acrylic resin-melamine/formaldehyde resin composition which, like the coating in the Fuerst patents, is applied over the already impregnated decor sheet, after the saturated decor sheet has been dried.

U.S. Pat. No. 4,322,468 to Raghava uses a special coating composition of a fully hydrolyzed polyvinyl alcohol modified melamine-formaldehyde resin.

U.S. Pat. No. 4,713,138 to Ungar et al. discloses a method of providing a paper facing sheet for use as the uppermost sheet in the manufacture of abrasion resistant decorative laminates. The process includes the step of effecting coating and impregnating in essentially one step. According to this patent, the laminated panel has an abrasion resistant composition deposited in an ultra-thin layer.

U.S. Pat. No. 4,880,689 to Park et. al., U.S. Pat. Nos. 4,940,503 and 5,034,272 to Lindgren et al., U.S. Pat. Nos. 5,266,384 and 5,702,806 to O'Dell et al., U.S. Pat. Nos. 5,288,540, 5,362,557, 5,456,949 and 5,558,906 to Albrinck et al., and U.S. Pat. Nos. 5,037,694, 5,093,185 and 5,037,694 to Ungar et al. all disclose decorative laminates and/or processes for preparing decorative laminates.

None of these patents disclose decorative laminates that have abrasion resistant particles with an average particle size from about 9 to about 12 microns and particle concentration of from about 2 to 4 grams per square meter of surface area. Furthermore, none of these patents disclose a process, which involves simultaneously coating: (i) the top surface or side of a dried, partially impregnated paper with an abrasion resistant coat, and (ii) the bottom surface or side of the dried, partially impregnated paper with a thermosetting resin coating. Thus, none of these patents describe the efficient process and construction of the subject low pressure laminated panel.

SUMMARY OF THE INVENTION

It is an object of the present invention to provide a process for the manufacture of a high quality, abrasion resistant laminated panel.

It is another object of the present invention to provide such a process in which the panel is preferably a low pressure laminated panel.

It is still another object of the present invention to provide such a process that produces a printed decorative laminated panel or a solid color laminated panel.

It is a further object of the present invention to provide such a process that is less expensive due to less handling required by the process.

It is still further object of the present invention to provide such a process that has simultaneous coating of the top and bottom surfaces of a resin impregnated web.

It is yet a further object of the present invention to provide such a panel in which particles are not applied in the dry state.

These and other objects of the invention are attained by providing a laminated panel having an abrasion resistant surface. The abrasion resistant panel comprises: a single, thermoset resin impregnated web having a first surface and a second surface; an abrasion resistant top coat on the first surface of the thermoset resin impregnated web; a bottom coat of a thermoset resin on the second surface, opposite the first surface, of the thermoset resin impregnated web; a substrate, wherein said substrate is thermally bonded to the thermoset resin impregnated web that is coated; and a resin impregnated bottom or balancing sheet thermo-fused to said substrate on a surface of said substrate opposite the bottom coat.

The above laminated panel having an abrasion-resistant surface is manufactured by a process, comprising: (a) partially impregnating a paper sheet or web with a thermosetting resin, wherein said partial impregnation is carried out so that about 40% to about 60% of the total resin required for full saturation is used; (b) drying the partially impregnated web to a volatile content from about 10% to about 15%, preferably from about 11% to about 13%; (c) coating the top surface or side of the dried, partially impregnated web with an abrasion resistant thermoset resin coat; (d) simultaneously coating the bottom surface or side of the dried, partially impregnated web with a thermosetting resin coat; (e) thermo-fusing the coated web onto a substrate; and (f) simultaneously thermo-fusing a resin impregnated bottom sheet to the other side of the substrate to produce a flat laminated panel. The resin impregnated bottom sheet may be made pursuant to steps (a) through (d) above, or without the abrasion resistant coat.

During simultaneous coating of the top and bottom surfaces, the amount of coating resin used is controlled by metering the amount of resin and abrasion resistant resin coat applied on each surface of the web.

The laminated panel produced in accordance with the present invention has an improved abrasion and scratch resistance.

DESCRIPTION OF THE DRAWINGS

FIG. 3 is Table 2, which is the abrasive mineral dispersion of the present invention; and FIG. 4 is Table 3, which is the top coat of the present invention.

DETAILED DESCRIPTION OF THE INVENTION

Figures 1, 2:
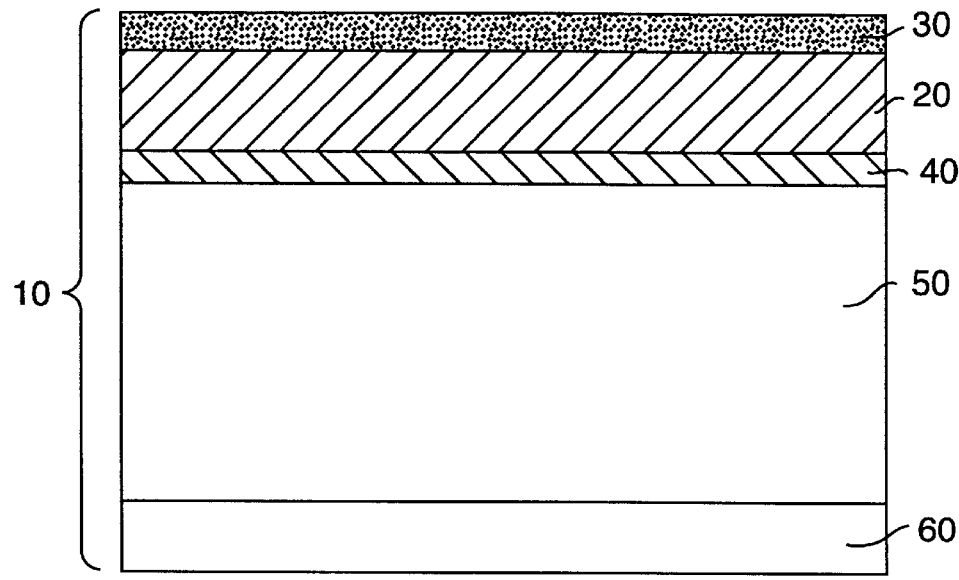
FIG. 1 is a side section view of a laminated panel of the present invention.
FIG. 2 is Table 1, which is the resin composition of the present invention.

Referring to the drawings and, in particular, FIG. 1, there is provided a laminated panel of the present invention generally represented by reference numeral 10. The laminated panel 10 includes a single web 20, a top coat 30 on one surface of the web, a bottom coat 40 on the other surface of the web, a substrate 50 thermo-fused to the bottom coat, and a bottom or balancing sheet 60 thermo-fused to the substrate on a surface of the substrate opposite the bottom coat. The top coat 30 and bottom coat 40 are thermoset resins that impregnate web 20.

The substrate 50 can be made of wood, composite material, medium density fiberboard, high-density board, particleboard or any other wooden panel. Preferably, substrate 50 is made of particleboard.

The web 20 suitable for producing a resin impregnated web is a fibrous material having pores sufficiently large for permitting penetration of the impregnation resin therethrough. Preferably, web 20 is derived from cellulose and/or modified cellulose. The web 20 preferably is a single paper sheet or web.

The resin used to impregnate web 20 is a thermoset or thermosetting resin derived from an amino resin and, optionally, a polyol. The amino resin can be a monomeric, oligomeric, polymeric or a mixture thereof. The amino resin can be formed by the reaction of an amino compound and an aldehyde, such as formaldehyde or glyoxal.

The amino compound is preferably selected from the group consisting of melamine, an N-substituted melamine such as N-methyl melamine, N,N'-dimethyl melamine and N,N',N"-trimethyl melamine, a guanamine derivative such as benzoguanamine and acetoguanamine, ethylene urea, dihydroxyethylene urea, urea, a substituted urea such as an alkyl substituted urea, a substituted guanidine and a mixture of any of the preceding amino compounds. It is believed that it may be possible that the amino compound is a guanamine derivative such as cyclohexyl carboguanamine, glycoluryl, a substituted urea such as biuret, triuret, or guanidine.

Preferably, the amino resin is prepared from the reaction of melamine or urea with formaldehyde, and can be further partially or fully etherified with an alcohol of 1 to 4 carbon atoms. Thus, the preferred amino resin can be a fully etherified, partially etherified or unetherified amino resin selected from the group consisting of a melamine formaldehyde resin, a urea formaldehyde resin and a mixture thereof.

The preferred thermosetting resin suitable for use with each different type of web 20, especially paper, is melamine formaldehyde resin. When a melamine formaldehyde amino resin is employed, the resin is prepared by combining formaldehyde with melamine in a ratio of melamine to formaldehyde from about 1:1.2 (melamine/formaldehyde) to about 1:2.5.

The polyol suitable for use with the amino resin is a reactive compound, such as a polyfunctional compound, having at least two hydroxyl groups or a group convertible thereto. The preferred polyol is selected from the group consisting of polyether polyol, polyhydric alcohol and mixtures thereof.

The resin compositions may further contain silanes. However, silanes are not preferred. The composition used for the top coat may contain small quantities of an additive, such as a surfactant, to produce uniform compositions and/or a solid lubricant to provide scuff resistance.

The abrasion resistant top coat or layer 30 is a resin containing an abrasion resistant hard mineral of fine particles. The fine particles are dispersed in the amino resin mixture and are added to the web, but not in dry form. The fine particles are in quantities sufficient to provide an abrasion resistant layer without interfering with clarity.

The abrasion resistant particles are selected from the group consisting of alumina, silica and mixtures thereof. Preferably, the average particle size of the abrasion resistant particles is from about 9 to about 12 micron. An example of a suitable abrasion resistant particle is a mixture of alumina particles of about 9 and 12 micron. In practice, a calculated amount of the dispersion containing the particles is added to the resin used in top coat 30 to yield about 2 to about 4 grams per square meter of particles on the surface of web 20. The abrasion resistant top coat 30 in the present invention is not an ultra-thin layer.

The term "abrasion resistant coat" is used herein to denote a composition or coat comprising abrasion resistant particles in thermoset resin. The abrasion resistant coat 30 is applied as a thin layer on one surface of web 20, and has, as stated above, a concentration of particles from about 2 to about 4 grams per square meter of surface area. The laminated panel 10 also has a matte finish with a gloss meter reading about 10 to about 50 units. It is preferred that the gloss meter reading is about 15 to about 25 units.

The resin used as bottom coat 40 is preferably the same resin as that of top coat 30. However, unlike top coat 30, bottom coat 40 does not have any abrasion resistant particles therein. The use of resin systems other than amino resins in bottom coat 40 is also possible, but such use generally is not preferred.

The bottom coat 40 provides an interface between web 20 and substrate 50 through which the impregnated web and the substrate are thermally bonded in the thermo-fusing step.

The bottom on balancing sheet 60 is made of the same material as web 20. Sheet 60 is also impregnated with a top coat and a bottom coat. The top coat of bottom sheet 60 may include one or more type of abrasive resistant particles. The bottom coat of sheet 60 is made of the resin used in bottom coat 40. It should be noted that bottom sheet 60 may be the same color or a different color than that of web 20.

The process of the present invention includes partially impregnating web 20, such as a paper sheet, with the thermosetting resin. Partial impregnation is carried out so that only about 40% to 60% of the total resin required for full saturation is added. After the partial impregnation step, impregnated web 20 is dried in an air float oven to reduce the level of the volatile components and obtain an impregnated paper having a volatile content from about 10% to about 15%, and preferably about 11% to about 13%. The final mixture viscosity should be low enough so that almost immediate saturation occurs after coating of web 20. Thereafter, the top or the exposed side of the partially impregnated web 20 is coated with an abrasion resistant top coat 30. This top coat is achieved by depositing on one surface, the top surface, of web 20 a layer of the abrasion resistant top coat 30. Simultaneously, the other or bottom surface of web 20 is coated with the thermosetting resin to produce bottom coat 40. Simultaneous coating is preferably carried out by metering the amount of resin and abrasion resistant coat applied on web 20 before and after each application.

When the thermosetting resin is a melamine formaldehyde resin, the resultant wet paper or web 20 is dried at an oven temperature from about 80° C. to about 180° C. This partial drying is carried out to further remove some of the volatile components and to partially advance or cure the resin.

The coated web 20 is then thermo-fused onto substrate 50, by bottom coat 40 preferably at an applied pressure from about 250 to about 450 pounds per square inch and a temperature from about 150° C. to about 200° C.

The bottom or balancing sheet 60 is made by the same process as making web 20, except the resin for the top coat of bottom sheet 60 may not have any abrasive particles therein. The bottom coat of bottom sheet 60 is thermo-fused into a surface of substrate 50 opposite web 20, to produce the abrasion resistant laminated panel 10 of the present invention.

The laminated panel 10 of the present invention is useful in providing articles, which have an abrasion-resistant surface adapted to withstand extended use conditions without showing obvious signs of wearing or deterioration.

The melamine formaldehyde resin, which is also called melamine resin in the present invention, is the conventional melamine formaldehyde resin that is used in the production of low pressure laminates. The resin is manufactured from melamine crystal, formaldehyde solution, glycol, sugar, and water. The glycol is a plasticizer, while the sugar is used as an extender. All of these ingredients are charged in a kettle. Polymerization is conducted under atmospheric reflux and controlled alkaline pH. At the end of the reaction, the remaining additives are added during cooling. After cooling, the pH of the resin may be adjusted for storage.

Table 1 of FIG. 2 is the resin composition for the saturation stage and bottom coat. It includes melamine formaldehyde resin, urea formaldehyde resin, glycol, preferably diethylene glycol, and at least one catalyst. The catalyst used is one or more of the following: a solution of para-toluenesulfonic acid (PTSA) blocked with an amine or unblocked; methane-sulfonate blocked with an amine; and phosphate ester.

Table 2, shown in FIG. 3, sets forth the ingredients and amounts of each ingredient that is in the abrasive mineral dispersion. The ingredients set forth in Table 2 are mixed in a vessel equipped with a high shear mixer until a stable dispersion is formed.

As set forth in Table 2 of FIG. 3, there is a certain amount of propylene glycol, the melamine formaldehyde resin and water. In addition, additives include a wetting agent, a defoamer, a first dispersing agent, a second dispersing agent, a suspension agent and natural cellulose fibers. The remaining additives may include a lubricant and a chelating agent.

The wetting agent reduces surface tension. A preferred wetting agent is alkylphenol ester in a petroleum distillate.

The defoamer is intended to prevent formation of foam during shearing. A preferred defoamer is a non-silicone.

The first dispersing agent is intended to prevent flocculation of the dispersed particles. It is preferred that the first dispersing agent is an ammonium salt of acrylic polymer. The second dispersing agent is a thixotropic agent. It is preferred that the second dispersing agent is alkanolammonium salt of a polycarboxylic acid of low molecular weight.

The suspension agent prevents hard packing of the abrasive particles. Any conventional suspension agent that achieves this function can be used.

The NaOH 4N is used primarily to obtain a neutral pH. The natural cellulose fibers preferably has a fiber length from about 15 to about 25 microns.

Table 3, as set forth in FIG. 4, sets forth the top coat 30 of the present invention. Basically, top coat 30 has the melamine formaldehyde resin, the dispersion of particles set forth in Table 2, a release agent, and at least one catalyst, such as the catalyst of Table 1.

The release agent is used to prevent the panel from sticking to the plate used in manufacturing. The release agent can be any conventional release agent that does not affect the materials of the laminate.

The following specific examples are provided to illustrate the process of the present invention.

EXAMPLE 1

A continuous paper web 20 is impregnated, to about 40% to about 60% of the total resin required for full saturation, by dipping in a saturating bath containing the composition set forth in TABLE 1 of FIG. 2. The melamine formaldehyde resin present in the composition is prepared by mixing the preferred melamine ingredients of the present invention. After saturation, the excess resin is squeezed out between a pair of nip rolls at the end of the saturating bath. The paper web is then dried in an air float oven to a volatile content from about 10% to about 15%. The resin reaches a gel consistency so that resin applied in the subsequent coating stages does not completely blend with the resin applied in the saturation stage. A stable dispersion having the abrasive resistant particles is prepared by mixing the ingredients set forth in TABLE 2 of FIG. 3 in a high shear mixer until a stable dispersion is formed. This can be prepared separately and stored until use, or it can be prepared at this time. The abrasion resistant top coat 30 having melamine formaldehyde resin and the abrasive resistant particles, is then prepared by mixing the abrasive resistant particle dispersion, melamine formaldehyde resin, a release agent and a catalyst Table 3. A measured quantity of the abrasion resistant top coat 30 is then applied to the top surface of paper web 20. Simultaneously, the saturating composition of Table 1 having melamine formaldehyde resin is applied as bottom coat 40 to the bottom surface of paper web 20 in an amount sufficient to prevent paper curling and to achieve strong thermo-fusion with substrate 50. The treated web 20 thus formed is then dried to the desired level of volatile content and stored for subsequent lamination. The treated web 20 is thermo-fused to a particleboard substrate 50 in a flat or a continuous double belt press at about 150° C. to about 200° C. temperature and about 250 to about 450 pounds per square inch pressure. The bottom sheet 60 is simultaneously thermally fused to substrate 50 to produce a laminated panel in accordance with the present invention.

For a printed decorative laminated panel, the initial abrasion point (IP) of the decorative surface made with this technique is from about 100 to about 250 cycles as determined by the NEMA LD 3-1995 Wear Resistance Method. The Wear Resistance values are above 400 cycles for the decorative surface prepared using the process of the present invention.

The present invention is used preferably to produce a printed decorated laminate panel. However, the present invention may be used to provide a solid color laminate panel.

While the method/process of the present invention is primarily directed to low pressure laminates, it is believed that it can also be used to make high pressure laminates.

It will be obvious to those skilled in the art that various changes may be made without departing from the scope of the present invention and that the invention is not to be considered limited to what is described and exemplified in the specification.

What is claimed is:

1. A laminated panel having an abrasion resistant surface, comprising:

a single web having a first surface and a second surface, said single web being impregnated with a thermoset resin;

an abrasion resistant top coat on the first surface of said web, said top coat including the thermoset resin, a plurality of abrasive resistant particles, and one or more additives to facilitate dispersion of the abrasive resistant particles within the top coat, wherein the abrasion resistant particle concentration in said top coat is from about 2 to 4 grams per square meter;

a bottom coat that includes a thermoset resin, said bottom coat being impregnated in the second surface of said web;

a substrate being thermo-fused to said bottom coat of said web; and a bottom sheet being thermo-fused to a second surface of said substrate opposite said bottom coat of said web.

2. The laminated panel of claim 1, wherein the particle size of each abrasion resistant particle is from about 9 to about 12 microns.

3. The laminated panel of claim 1, wherein the substrate is a particleboard.

4. The laminated panel of claim 1, wherein the thermoset resin is derived from:

an amino resin; and optionally, a polyol having at least two hydroxy groups.

5. The laminated panel of claim 4, wherein the amino resin is an etherified or unetherified amino resin selected from the group consisting of a melamine formaldehyde resin, a urea formaldehyde resin and mixtures thereof.

6. The laminated panel of claim 5, wherein the polyol is selected from the group consisting of a polyether polyol, a polyhydric alcohol and mixtures thereof.

7. The laminated panel of claim 1, wherein the abrasion resistant top coat comprises abrasion resistant particles selected from the group consisting of alumina, silica and mixtures thereof.

8. The laminated panel of claim 1, wherein the resin impregnated web comprises paper.

9. The laminated panel of claim 1, wherein the one or more additives to facilitate dispersion of the abrasive resistant particles within the top coat comprises at least one dispersing agent.

10. The laminated panel of claim 9, wherein the one or more additives to facilitate dispersion of the abrasive resistant particles within the top coat further comprises cellulose fibers.

11. The laminated panel of claim 1, wherein the one or more additives to facilitate dispersion of the abrasive resistant particles within the top coat comprises cellulose fibers.

12. A laminated panel prepared by the process comprising the steps of:

partially impregnating a paper sheet with a thermosetting resin, wherein said partial impregnation is carried out so that about 40% to about 60% of the total resin required for full saturation is used;

drying the partially impregnated paper to a volatile content of about 10% to about 15%;

coating the top surface of the partially impregnated paper with an abrasion resistant coat;

simultaneously coating the bottom surface of the partially impregnated paper with a thermosetting resin coating, wherein said top and bottom surface coatings are carried out by metering the amount of resin and abrasion resistant coat applied on the paper; and thermo-fusing the coated paper onto a substrate; and simultaneously thermo-fusing a bottom sheet to a surface of the substrate opposite the coated paper to produce the laminated panel.

* * * * *